United States Patent [19]

Bengtsson

[11] Patent Number: 5,170,045
[45] Date of Patent: Dec. 8, 1992

[54] PRICE TAG DEACTIVATOR

[75] Inventor: Kjell Bengtsson, Balsta, Sweden

[73] Assignee: Esselte Meto Eas Int. AB, Bromma, Sweden

[21] Appl. No.: 670,439

[22] Filed: Mar. 18, 1991

[30] Foreign Application Priority Data

Mar. 20, 1990 [SE] Sweden ................................ 9001003
Jun. 7, 1990 [SE] Sweden ................................ 9002049

[51] Int. Cl.⁵ ........................ G06K 7/10; G08B 13/14
[52] U.S. Cl. .................................. 235/462; 235/383; 340/572
[58] Field of Search .............. 235/462, 375, 383, 439, 235/449, 487; 340/572, 551; 283/74, 79

[56] References Cited

U.S. PATENT DOCUMENTS

| | | | |
|---|---|---|---|
| 4,684,930 | 8/1987 | Minnsy et al. | 340/551 |
| 4,769,631 | 9/1988 | Copeland | 340/572 |
| 4,956,636 | 9/1990 | Sansom et al. | 340/572 |
| 5,059,951 | 10/1991 | Kaltner | 235/375 |

FOREIGN PATENT DOCUMENTS

| | | |
|---|---|---|
| 0257767 | 9/1988 | European Pat. Off. . |
| 9000785 | 1/1990 | PCT Int'l Appl. . |
| 8502285 | 5/1985 | World Int. Prop. O. ........... 340/572 |

Primary Examiner—John W. Shepperd
Assistant Examiner—Tan Nguyen
Attorney, Agent, or Firm—Sixbey, Friedman, Leedom & Ferguson

[57] ABSTRACT

A device for deactivating price tags of the kind provided with a magnetic strip intended to form part of an anti-theft store security system, said device being intended for use together with a so-called scanner used to optically read a bar code on an item of goods. The invention is characterized in that the deactivator (2) includes two or more mutually adjacent and mutually parallel rows (4, 5) of permanent magnets (6, 7), where the magnets (6) in one row (4) form pairs of permanent magnets, partly with surrounding magnets in said row and partly with adjacent magnets (7) in an adjacent row (5), said paris (6, 7) being disposed in a plane which is completely or substantially parallel with the plane in which the bar code on a goods item is located when reading said code; in that the south pole of a first magnet (6) in said magnet pair is located on a magnet surface facing away from the deactivator (2) and the north pole of said first magnet is located on a magnet surface which faces towards the deactivator (2); and in that the respective south and north poles of a second magnet (7) of said magnet pair face in opposite directions.

4 Claims, 1 Drawing Sheet

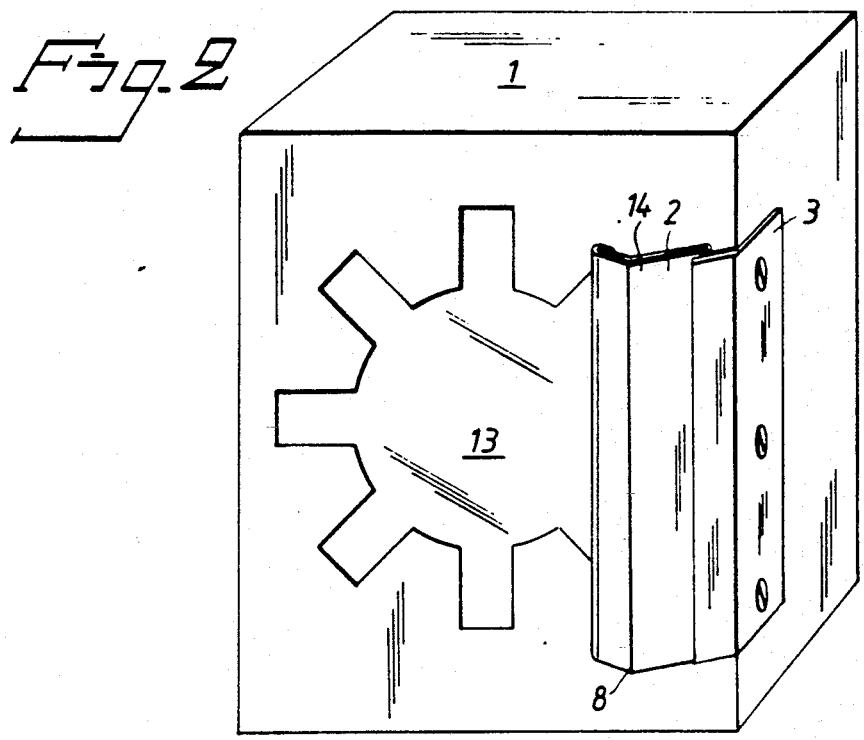
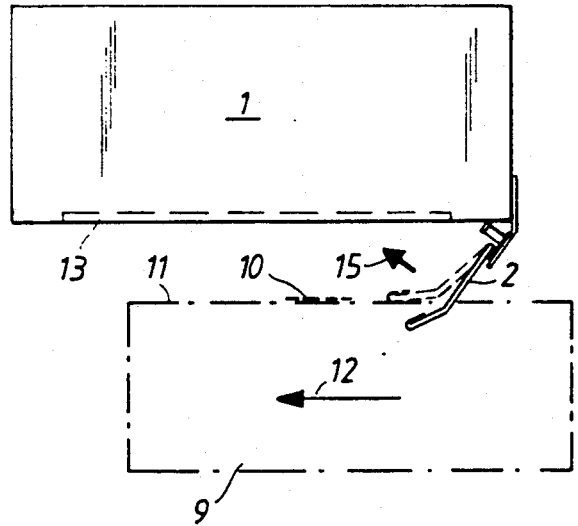
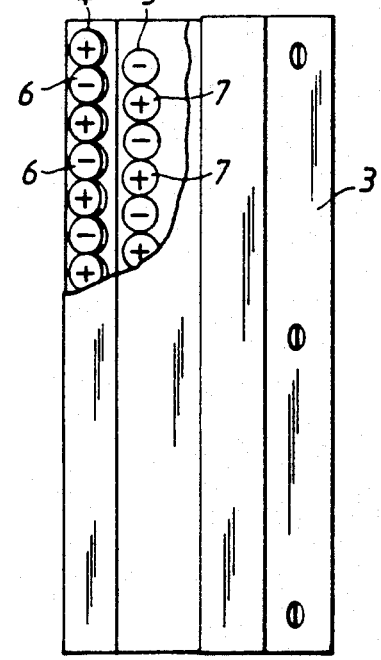

PRICE TAG DEACTIVATOR

BACKGROUND OF THE INVENTION

The present invention relates to a device for deactivating price tags, or labels, of the kind that incorporate a magnetic tape which is intended to form part of an anti-theft store supervising system.

It has become progressively more usual for goods in self-service stores and shops to be provided with a bar code which can be read-off at the cash desk, thereby to automatically record the price of the item of goods in question, among other things. Alternatively, there can be used a so-called upstanding or a so-called horizontal scanner which is a fixedly mounted optical device which projects the bar code and reads said code and delivers an electric signal to a computer or microprocessor, this signal corresponding to the information contained in the bar code. Scanning is effected when the cashier passes the item of goods past the scanner with the bar code facing theretowards.

It has also become more usual in recent times to provide price-tagged goods with an alarm means, by incorporating a magnetic alarm strip in the price tags, this strip being intended to coact with transmitter coils and receiver coils disposed in the proximity of the cash desk or in the proximity of an exit, such that if an item of goods is not presented for payment an alarm is given when the goods pass between the coils.

In order to prevent the triggering of an alarm by goods which have been paid for, the alarm strip on the price tag is deactivated by exposing the strip to a powerful permanent magnetic field. At present, this is effected by holding the price tag close to a fixedly mounted permanent magnet. This method necessitates the cashier first to pass the goods past the scanner with the bar code on the goods facing towards the scanner and then to move the price tag on the goods against the permanent magnet. Thus, the cashier is required to perform two different procedural steps, namely recording the item of goods by reading the bar code and deactivation of the alarm strip.

SUMMARY OF THE INVENTION

The present invention relates to a device which enables these two procedures to be carried out in only one single procedural step. The present invention provides a considerable improvement, when seen against the background of the very large number of goods items handled by a cashier at the cash desk.

The present invention thus relates to a device for deactivating price tags of the kind provided with a magnetic tape which is intended to form part of an anti-theft store supervising system, said device being intended for use together with a so-called scanner for optically reading a bar code on a goods item, and is characterized in that the deactivator includes two or more mutually adjacent and mutually parallel rows of permanent magnets, of which the magnets in one row form pairs of permanent magnets, partly with surrounding magnets in the row and partly with adjacent magnets in an adjacent row, said pairs being disclosed in a plane which is completely or substantially parallel with the plane in which the bar code of a goods item is located when reading said bar code; in that the south pole of a first magnet in said magnet pair is located on the surface of the magnet directed outwardly from the deactivator and the north pole of said magnet pair is located on a surface directed inwardly towards the deactivator; and in that the south and north poles respectively of a second magnet in said magnet pair are directed in opposite directions.

BRIEF DESCRIPTION OF THE DRAWINGS

The invention will now be described in more detail with reference to an exemplifying embodiment of the invention illustrated in the accompanying drawings, in which FIG. 1 is a top view of a so-called scanner provided with a device according to the present invention;

FIG. 2 is a perspective, side view of the scanner; and

FIG. 3 is a side view of an inventive device, with the device partly cut-away.

DETAILED DESCRIPTION OF THE DRAWING

FIG. 1 illustrates a scanner 1 provided with an inventive device 2 for deactivating price tags of the kind which incorporate a magnetic tape intended to form part of an anti-theft store supervising system. The deactivator 2 is attached to the scanner 1 by means of an attachment plate 3, for instance.

According to the invention, the deactivator 2 includes two or more mutually adjacent and mutually parallel rows 4, 5 of permanent magnets 6, 7, see FIG. 3. The magnets in a one row 4 form pairs 6, 7 of permanent magnets, partly with surrounding magnets in the row and partly with adjacent magnets in an adjacent row 5, said pairs 6, 7 being disposed in a plane which is substantially parallel with the plane in which the bar code is located when read-off. The magnets are carried by a casing 14, which is made of a non-magnetic material, preferably non-magnetic stainless metal sheet.

The magnets in each pair of magnets are positioned adjacent one another in a plane which is completely parallel with, or essentially parallel with, the plane in which the price tags and the bar code are located when reading-off the bar code. This plane is perpendicular to the plane of the paper in FIG. 1. In the illustrative embodiment, the two rows, 4, 5, of magnets form a given angle therebetween, in that respective rows are placed on opposite sides of a bending line 8 on the deactivator. The rows, however, may also be placed in one and the same plane.

FIG. 1 illustrates in chain lines an item of goods 9 which is provided with a price tag or label, shown in broken lines 10. Located somewhere on the surface 11 of the goods item provided with the price tag 10 is the bar code to be read by the scanner. When reading the bar code, the item of goods is moved past the scanner 1, in the direction of arrow 12. The scanner is of a kind available commercially and has a window 13 and optical reading means located inwardly of the window.

The deactivator is constructed so that the south pole of a first magnet 6 of a magnet pair is located on the magnet surface directed away from the deactivator 2 and the north pole of said magnet is located on a surface facing in towards the deactivator. The respective south and north poles of a second magnet 7 of said magnet pair face in opposite directions. The south poles and north poles are referenced — and + respectively in FIG. 3. This positioning of the poles generates a powerful magnetic field in front of the deactivator.

According to one preferred embodiment of the invention, two rows 4, 5 of magnets are provided.

The deactivator 2 is fixedly mounted relative to the scanner 1, in a position relative to said scanner such that the price tag 10 on a goods item 9 will pass against or in the close proximity of the deactivator 2 when reading the bar code.

The deactivator 2 is preferably resiliently mounted, so that it will move resiliently in the direction of the arrow 15 from the position shown in full lines to the position shown in broken lines without requiring any undue force, when an item of goods is brushed or stroked against the deactivator. In this respect, either the attachment plate 3 and/or the casing 14 may be resiliently designed.

When the price tag of a goods item is moved to a position close to the deactivator, the alarm strip on the price tag will be deactivated by means of the permanent magnet or magnets 3, 4, in that the magnetic field from the magnet or magnets will magnetize magnetic sections on the alarm strip, so that the alarm strip will no longer transmit into modulation products of sufficient strength to be detected when the alarm strip is exposed to a magnetic alternating field having at least two frequencies.

It will be understood that several pairs of magnets can be placed adjacent one another, therewith to obtain a broader magnetic field in the movement direction 12 of said goods.

In order for a deactivator of the kind proposed to produce the effect intended, it is necessary that the price tag provided with an alarm strip is placed on the same side of the item of goods as the bar code, and preferably close to said code. This presents no problem, however, since the person who price-marks the goods can be instructed to place the price tags in the immediate vicinity of the bar code.

When the bar code on an item of goods is to be read-off, the item is moved past the deactivator and the scanner, in the manner illustrated in FIG. 1, therewith deactivating the price tag at the same time as the bar code is read-off.

It is evident that the present invention will overcome the drawbacks mentioned in the introduction, since the price tag is deactivated when reading the bar code. This eliminates one procedural step earlier performed by the cashier while, at the same time, eliminating the risk that an item of goods for which payment has been made will release an alarm because the cashier has forgotten to deactivate the price tag. An alarm which is given by mistake is often experienced as highly troublesome by the customers concerned.

It will be understood that the present invention is not restricted to the aforedescribed embodiment and that modifications can be made. For instance, the number of magnets can be varied, as can also the configuration of the deactivator and the manner of its attachment in or adjacent the scanner.

The present invention is thus not restricted to the aforedescribed embodiments, since modifications can be made within the scope of the following claims.

I claim:

1. A device for deactivating price tags of the kind provided with a magnetic strip intended to form part of an anti-theft store security system, said device being intended for use together with a scanner used to optically read a bar code on an item of goods, characterized in that the deactivator (2) includes at least two mutually adjacent and mutually parallel rows (4, 5) of permanent magnets (6, 7), where the magnets (6) in one row (4) form pairs of permanent magnets, partly with surrounding magnets in said row and partly with adjacent magnets (7) in an adjacent row (5), said pairs (6, 7) being disposed in a plane which is completely or substantially parallel with the plane in which the bar code on a goods item is located when reading said code; in that said south pole of a first magnet (6) in said magnet pair is located on a magnet surface facing away from the deactivator (2) and in that the respective south pole of a second magnet of said magnet pair faces in an opposite direction.

2. A device according to claim 1, characterized in that the deactivator (2) includes more than two parallel rows of permanent magnets.

3. A device according to claims 1 or 2, characterized in that said deactivator (2) is fixedly mounted relative to the scanner (1) in a position relative to said scanner such that the price tag on a goods item will pass against or close to the deactivator when reading the bar code on said item.

4. A device according to claim 3, characterized in that the deactivator (2) is resiliently mounted.

* * * * *